(12) United States Patent
Bertin et al.

(10) Patent No.: US 9,449,453 B2
(45) Date of Patent: Sep. 20, 2016

(54) PORTABLE ELECTRONIC ENTITY AND METHOD FOR PERSONALIZATION OF SUCH AN ELECTRONIC ENTITY

(75) Inventors: Marc Bertin, La Celle les Bordes (FR); Stéphane Jayet, Meyzieu (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 947 days.

(21) Appl. No.: 11/997,558

(22) PCT Filed: Oct. 30, 2007

(86) PCT No.: PCT/FR2007/001798
§ 371 (c)(1),
(2), (4) Date: Mar. 11, 2008

(87) PCT Pub. No.: WO2008/065264
PCT Pub. Date: Jun. 5, 2008

(65) Prior Publication Data
US 2010/0093334 A1    Apr. 15, 2010

(30) Foreign Application Priority Data

Nov. 7, 2006    (FR) .................................... 06 54769

(51) Int. Cl.
*G07F 7/10*    (2006.01)
*G06F 21/12*    (2013.01)
*G06Q 20/34*    (2012.01)

(52) U.S. Cl.
CPC ........... *G07F 7/1008* (2013.01); *G06F 21/123* (2013.01); *G06Q 20/341* (2013.01); *G06Q 20/355* (2013.01); *G06Q 20/3578* (2013.01); *G06F 2221/2153* (2013.01)

(58) Field of Classification Search
CPC ........... G07F 7/1008; G06Q 20/3578; G06Q 20/341; G06Q 20/355; G06F 21/123; G06F 2221/2153
USPC .................................... 235/379, 380; 380/23
See application file for complete search history.

(56) References Cited

U.S. PATENT DOCUMENTS 5,557,679 A *  9/1996 Julin et al. .................... 380/249
6,196,459 B1   3/2001 Goman et al.
(Continued)

FOREIGN PATENT DOCUMENTS

JP    2003168093 A    6/2003
JP    H06511125 A     6/2003
(Continued)

OTHER PUBLICATIONS

Japanese Office Action, dated Sep. 27, 2011, in Application No. 2009-530912.

*Primary Examiner* — Nizar Sivji
(74) *Attorney, Agent, or Firm* — Young & Thompson

(57) ABSTRACT

The "first" portable electronic entity (100) includes elements (105) for connection to a host station and a memory (120) storing instructions of an application (121) adapted to be at least partially loaded into the host station, to be executed by the host station and to collaborate with a server connected to the host station to effect the personalization of a "second" portable electronic entity (100). In embodiments, the second electronic entity is the first electronic entity. In embodiments, the application is at least partially executed by the first portable electronic entity.

26 Claims, 2 Drawing Sheets

(56) References Cited

U.S. PATENT DOCUMENTS

| | | | |
|---|---|---|---|
| 6,813,498 B1* | 11/2004 | Durga et al. | 455/456.1 |
| 2003/0105969 A1 | 6/2003 | Matsui et al. | |
| 2003/0220094 A1* | 11/2003 | Hicks | 455/410 |
| 2005/0279826 A1* | 12/2005 | Merrien | 235/380 |
| 2007/0136797 A1 | 6/2007 | Tanabikiq et al. | |
| 2007/0271162 A1* | 11/2007 | Shuster | 705/34 |
| 2008/0263680 A1 | 10/2008 | Bertin | |
| 2009/0235037 A1 | 9/2009 | Mounier et al. | |
| 2010/0176203 A1 | 7/2010 | Mounier et al. | |

FOREIGN PATENT DOCUMENTS

| | | |
|---|---|---|
| WO | 2006075576 A1 | 7/2006 |
| WO | 2007/125212 | 11/2007 |

* cited by examiner

PORTABLE ELECTRONIC ENTITY AND METHOD FOR PERSONALIZATION OF SUCH AN ELECTRONIC ENTITY

The present invention concerns a portable electronic entity and a method for personalization of such an electronic entity. It applies in particular to portable electronic entities of the type including a non-volatile memory and a microcontroller; it is a question, for example, of a USB (Universal Serial Bus) electronic key, i.e. a key whereof the physical interface with a host computer conforms to the USB specification and adapted to communicate in accordance with a protocol conforming to the USB specification. The portable electronic entity that is the subject matter of the present invention can also be a microcircuit card, for example a microcircuit card conforming to the ISO 7816 standard or an MMC (MultiMedia Card) card.

BACKGROUND OF THE INVENTION

Before its initialization, also referred to as "pre-personalization", a portable electronic entity cannot function, in particular for applications requiring a high level of security, for example for the authentication of its bearer, access to a pay service or a payment. For it to support this type of application, the initialization of a portable electronic entity concerns at least two main types of information: application data, including the code of the applications and the values of their variables, and security data, generally encryption keys. The data can furthermore concern printed data, such as logos and bar codes, which are placed on the surface of the portable electronic entity.

Complementing initialization, the aim of personalization of the portable electronic entities is for the organization that issues them to have available entities corresponding to its particular services and applications. It also aims for each portable electronic entity to contain data concerning its bearer (for example name, telephone number, account number and photograph, signature, data defining the services to which the bearer is entitled and limit amounts for those services) and where applicable here also security data such as encryption keys.

In the technical literature, the concepts of initialization and personalization are often lumped together under the common term "personalization", which we opt to do here, although these steps can be separate and carried out by different service providers, for example, for security reasons, in particular in the field of bank cards.

Personalization is carried out by a personalization station that processes personalization data.

The portable electronic entity includes a rewritable non-volatile memory, for example an EEPROM (Electrically Erasable and Programmable Read Only Memory). Electrical personalization consists essentially in a step of initialization of that non-volatile memory, and thus of the portable electronic entity, and a step of storing in this memory data that varies from one portable electronic entity to another.

SUMMARY OF THE INVENTION

The present invention concerns in particular electrical personalization of the portable electronic entity. However, in the context of the present invention, electrical personalization also concerns updating of the rewritable non-volatile memory, for example by applications, menus or personal or security data. Such updates are for example carried out in the context of administering an installed base of electronic entities.

The inventors have determined that it would be desirable to provide personalization capacities on a general purpose host station without that station being modified or having dedicated applications in memory.

To achieve these objects, a first aspect of the invention is aimed at a "first" portable electronic entity including means for connection to a host station and a memory storing instructions of an application adapted to be at least partially loaded into said host station, to be executed by said host station and to collaborate with a server connected to the host station to effect the personalization of a "second" portable electronic entity.

Thanks to these provisions, the second portable electronic entity can be personalized on any host station capable of executing the personalization application carried by the first portable electronic entity. Moreover, the resources of the host station can be used and the application code stored in the memory of the first portable electronic entity can therefore be simplified.

According to particular features, the memory stores instructions of an application adapted to be at least partially executed on a host station including a personal computer.

According to particular features, the memory stores instructions of an application adapted to be at least partially executed on a host station including a mobile telephone.

Thanks to these provisions, a user can personalize a portable electronic entity with a mobile telephone.

According to particular features, the memory stores instructions of an application such that the second electronic entity is the first electronic entity.

The present invention is therefore particularly practical to implement because the personalization application is transported in the electronic entity to be personalized. The portable electronic entity therefore supplies the application for personalizing it, which limits the means to be used to effect that personalization.

According to particular features, the memory stores instructions of an application adapted to be at least partially executed by said first portable electronic entity. The security of the personalization process can therefore be reinforced by prohibiting copying of the part of the application executed by the portable electronic entity or by making the instructions of the application dependent on the portable electronic entity that stores it.

According to particular features, the second entity is an integrated circuit of the host station.

According to particular features, the memory stores instructions of an application for effecting the personalization of the second portable electronic entity, said personalization being controlled by a remote server.

According to particular features, said application is adapted to set up a secure connection, personalization being effected by secure communication between at least the electronic entity and a remote server that controls personalization.

According to particular features, said portable electronic entity includes means for storing at least one item of personalization status information and means for communicating at least one stored item of status information to a remote server that controls personalization.

Thanks to these provisions, the server can determine the status of the portable electronic entity and therefore effect personalization as a function of that status, which is particularly beneficial in the context of updating an installed base of electronic entities for the purpose of administering them.

According to particular features, the portable electronic entity includes means for storing at least the last personalization command received from a remote server that controls personalization and executed successfully and means for communicating this last command received and executed to said remote server.

According to particular features, the memory stores an identifier common to a plurality of portable electronic entities. Thanks to these provisions, the portable electronic entity can describe its type, its application, its brand and/or its model.

According to particular features, the memory stores a cryptographic key common to a group of portable electronic entities. Thanks to these provisions, communication between the first portable electronic entity and the host station and/or the server to which the first portable electronic entity is connected can be made secure without having to personalize the first portable electronic entity beforehand.

According to particular features, the portable electronic entity as succinctly described hereinabove includes a microcontroller adapted to operate in slave mode. Accordingly, the portable electronic entity merely responds to commands, for example from a reader in the case of a microcircuit card.

According to particular features, the portable electronic entity includes a secure microcontroller. For example, it conforms to FIPS (Federal Information Processing Standard) security requirements and/or common criteria and/or the ISO 7816 standard.

According to particular features, the application is launched automatically after connection of the portable electronic entity to the host station. Thus execution of the personalization application in the host station can be automated.

According to particular features, the entity as succinctly described hereinabove includes means for selecting the instructions of said application as a function of the host station. Thanks to these provisions, the host station can load instructions of an application adapted to be executed in the host station, for example as a function of its operating system.

The application can further comprise an address of the remote server on a network, which enables the host station to connect to that server without necessitating complementary information from the user.

The memory of the electronic entity that stores the personalization application, the identifier of the electronic entity and/or the address of the remote server is a read-only memory (ROM) of the electronic entity, for example. This avoids the need for preliminary personalization of the electronic entity, the data being inscribed in the mask of the read-only memory.

According to particular features, said application at least partially loaded into the host station is adapted to receive instructions from said server and to send them to the second portable electronic entity.

According to particular features, instructions received from said remote server are received in the form of at least one group of instructions for personalization of the second portable electronic entity, at least one group of personalization instructions including at least one personalization checking instruction enabling the host station to check correct execution of at least one personalization instruction.

The use of these particular features achieves two objectives that are a priori contradictory:

having most of the processing executed on a personalization server, and thus limiting the processing executed by the host station, and
limiting exchange of data between the host station and the personalization server.

These objectives are achieved in particular by the generation of personalization instruction groups by the personalization server. Thus the host station does not have to generate personalization instructions and does not have to request the personalization instructions one by one.

The personalization server also has a function of defining the checks on personalization that are carried out by the host station. The host station assuming responsibility for these checking instructions defined by the personalization server limits exchanges between the host station and the server.

According to particular features, at least one personalization instruction is an instruction directly understandable and executable by the second portable electronic entity.

Thanks to these provisions, the host station does not have to interpret personalization instructions that can be understood and executed directly by the portable electronic entity, and merely sends them to it.

According to particular features, at least one personalization instruction enables writing, by the second portable electronic entity, of data into the memory of the second portable electronic entity.

According to particular features, at least one checking instruction is the expected result of the execution of a personalization instruction by the second portable electronic entity.

Checking is therefore particularly easy to carry out. Checking of the expected result of the execution of a personalization instruction by the portable electronic entity is the minimum checking instruction for minimizing exchanges between the host station and the server.

According to particular features, at least one personalization instruction is a command to the APDU format of the ISO 7816 standard.

According to particular features, at least one checking instruction is a response to the APDU format of the ISO 7816 standard to a personalization instruction.

The present invention therefore applies to portable electronic entities implementing this standard.

According to particular features, the instructions of the application are such that the second electronic entity is the first electronic entity.

A third aspect of the present invention is directed to a method for personalization of a "second" portable electronic entity, which includes:
  a step of connection of a "first" portable electronic entity to a host station,
  a step of at least partial loading of an application the instructions whereof are stored by a memory of the first portable electronic entity into the host station from the first portable electronic entity, and
  a step of at least partial execution of said application by said host station to effect the personalization of the second portable electronic entity in collaboration with a remote server.

The advantages, aims and features of the host station and the method that are the subject matter of the second and third aspects of the present invention, respectively, being similar to those of the portable electronic entity that is the subject matter of the first aspect of the present invention, are not repeated here.

BRIEF DESCRIPTION OF THE DRAWINGS

Other advantages, aims and features of the present invention will emerge from the following description given by way of nonlimiting explanation with reference to the appended drawings, in which.

DETAILED DESCRIPTION OF THE PREFERRED EMBODIMENTS

Figure 1:
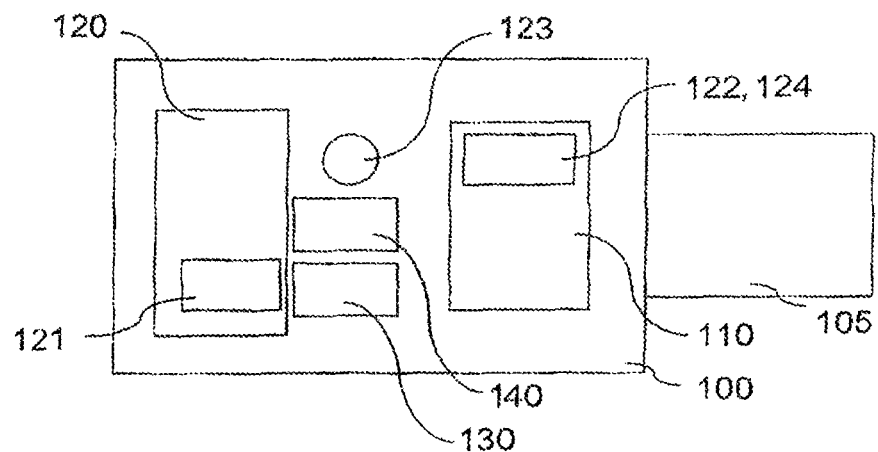
FIG. 1 represents, diagrammatically, one particular embodiment of a portable electronic entity constituting subject matter of the present invention.

There is seen, in FIG. 1, a removable portable electronic entity 100, including a microcontroller 110, an interface 140 (sometimes referred to as a hub) that enables communication of other elements of the entity with the external world via the connector 105 in accordance with the USE protocol, a controller 130 for managing a memory 120, which emulates a compact disc drive (for example of the CD-ROM type). Here the controller 130 emulates a CD-ROM drive in particular to enable automatic launching of a program stored in the memory 120, as described hereinafter.

The microcontroller 110 emulates a CCID (Chip/Smart Card Interface Devices) card reader and a CID (Card Interface Devices) card.

The portable electronic entity 100 is of a type including a non-volatile memory and a microcontroller. It is a USB (Universal Serial Bus) electronic key, i.e. a key whereof the physical interface 105 with a host station conforms to the USB specification, and adapted to communicate in accordance with a protocol conforming to the USB specification.

Note that the portable electronic entity 100 can also be a microcircuit card, for example a microcircuit card conforming to the ISO 7816 standard or an MMC (MultiMedia Card) card.

The electronic entity 100 can include a contactless communication interface (not shown), preferably a short-range contactless communication interface. It can therefore be a contactless microchip card or a dual interface microchip card (with both contact-type and contactless-type interfaces), for example conforming to the ISO 14443 standard. The portable electronic entity 100 can equally be a passport including, within the thickness of its cover, a secure microcontroller provided with contactless communication means conforming to the ISO 14443 standard. This kind of electronic entity can be personalized using the contactless-type interface or the contact-type interface if the electronic entity also comprises one of these.

The portable electronic entity 100 can be used in applications such as banking, mobile telephone, identification, on-line service access (for example voice over IP), pay television, for example.

The portable electronic entity 100 is preferably of the slave type, in the sense that it merely responds to commands, for example from a host station or a server (see FIG. 2) or a reader, in the case of a microcircuit card. Alternatively, the portable electronic entity 100 can take the initiative for sending data.

The microcontroller 110 is preferably secure. It preferably conforms to the FIPS security requirements already referred to (see above), to common criteria requirements and/or to the ISO 7816 standard.

The portable electronic entity 100 includes, in particular:
the microcontroller 110, which can in particular store in a read-only memory (ROM) an entity identifier 122 and an encryption key 124, preferably, a public key of a pair of keys associated with a remote server 250, and
the memory 120 I which stores instructions of a personalization application 121 (where applicable including an address of the remote server 250 on a network) and the last instruction received 123.

The application 121 could instead be stored in the read-only memory of the microcontroller 110 or in a read-only memory of the controller 130.

The application 121 is preferably available in the memory 120 of the portable electronic entity 100 in a number of versions adapted to function on different types of host station 200, for example with different operating systems.

The public key 124 is generated in parallel with a private key 251, for example.

It is seen that this architecture has the advantage of not necessitating any CCID component and of facilitating modification of the content of the application 121.

Figure 2:
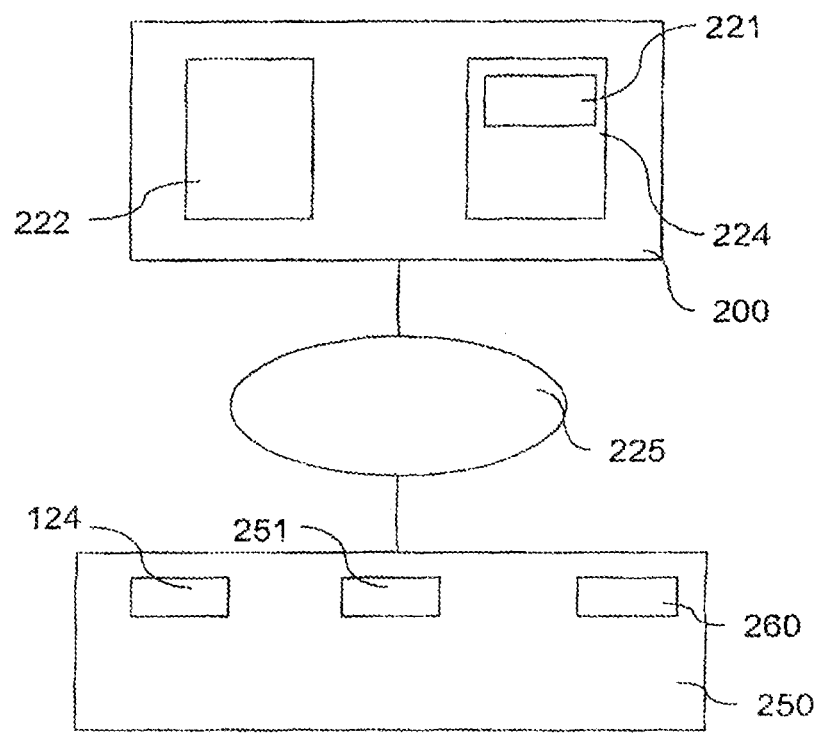
FIG. 2 represents, diagrammatically, one particular embodiment of a host station constituting subject matter of the present invention, connected to a server.

There is seen, in FIG. 2, a host station 200 connected by a computer network 225 to a server 250. The host station is of the personal computer, mobile telephone or portable electronic entity reader type, for example. The computer network 225 is the Internet network, for example. The server 250 is a web server, for example.

The host station 200 comprises a data storage device 224 and a CPU 222 that is adapted to receive and to execute, at least in part, the personalization application 121. To this end, it comprises, for example, an application 221 stored in and executable from the data storage device 224 for automatically launching a program on detection of a new disc reader, as provided on personal computers.

A remote server 250 uses and stores the public key 124, a private key 251 corresponding to the public key 124, and a database 260 of portable electronic entity identifiers, used as described hereinafter.

Figure 3:
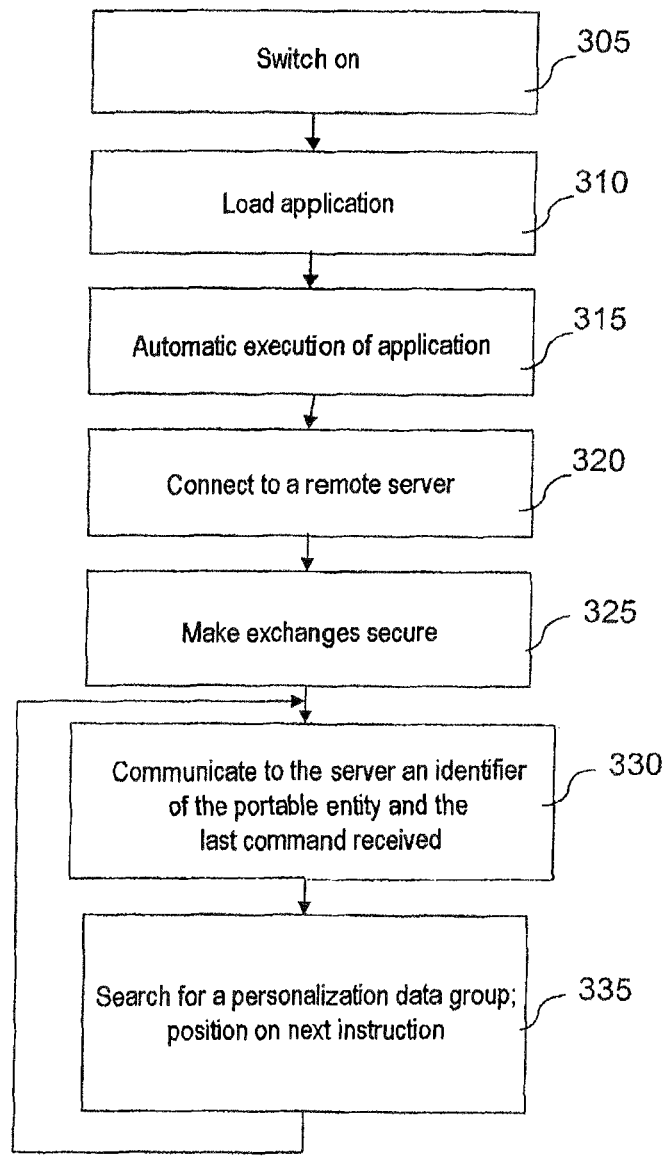
FIG. 3 represents, in the form of a flowchart, steps executed by the portable electronic entity shown in FIG. 1 and by the host station and the server shown in FIG. 2 in one particular embodiment of the method constituting subject matter of the present invention.

As shown in FIG. 3, as soon as the portable electronic entity 100 is switched on, for example on connecting that entity 100 to a host station that provides its electrical power supply, step 305, the application 121 is automatically loaded into the host station to which the electronic entity 100 is directly connected, step 310. This automatic loading can be effected in the form of the automatic launching (by means of the application 221), for example, of an application autorun.exe present in the memory 120 of the electronic entity 100 if the host station 200 detects the compact disc CD-ROM emulated by the controller 130 of the memory 120 and consequently reads the content of the memory 120 of the portable electronic entity 100 and then executes the application 121 automatically. The application 121 is therefore easy to install and execute automatically on the host station without requiring complex manipulation by the user.

With regard to step 310, the automatic launcher program 221 of the host station 200 is preferably capable of selecting the application 121 adapted to function on the host station 200.

To be more precise, if the memory 120 contains a plurality of programs 121, the application 221 selects that which corresponds to the operating system of the host station 200, for example in practice on the basis of the name of each file including the application 121. The application 221 then loads and executes the selected application 121.

Accordingly, during the step 315, the host station effects automatic execution of the application 121.

During a step 320, the host station connects to the remote server 250 situated at the address defined in the application 121. Alternatively, the address could be supplied by the user, for example.

During a step 325, the host station and the remote server set up a security procedure for exchanges between them, for example by jointly defining a unique session key or a pair of session keys. The application 221 preferably effects an authentication of the remote server 250 by, using the key 124, decrypting a message received from the remote server and including, encrypted with the private key 251, the public key 124. Thus only one public key 124 needs to be stored in the electronic entity 100 to decrypt the exchange and also to authenticate the remote server 250.

The microcontroller 110 then generates a public/private key pair and encrypts the public key 116 of that pair with the public key 124 and communicates it to the remote server 250. Then, during personalization steps, the remote server 250 sends the controller 110 instructions encrypted with the public key 116, which it has been able to obtain after decryption using the private key 251. Note that, for the execution of the step 325, the portable electronic entity can also store a symmetrical key (to execute the DES algorithm, for example, whereas the private/public key pair is used with an RSA algorithm for example); moreover, the part of the keys or the key used can be common to all the keys (or portable electronic entities) of the same type/model (corresponding to the same identifier) and encrypt exchanges between the microcontroller 110 and the remote server 250 using this pair of keys or this key.

More generally, the memory of the portable electronic entity can store a cryptographic key common to a group of portable electronic entities. In this way communication can be made secure between the first portable electronic entity and the host station and/or the server to which the first portable electronic entity is connected, without having to personalize the first portable electronic entity beforehand.

During a step 330, the host station 200 and/or the application 121 communicate to the remote server 250 an identifier 122 of the portable electronic entity, the last command 123 received from the remote server 250, and a serial number associated with that last command 123, for example a sequential serial number (in order to distinguish identical commands received at different times).

Note that the identifier stored in the portable electronic entity can be common to a plurality of portable electronic entities. Thus the portable electronic entity can describe its type, its application, its brand and/or its model.

In one variant that can be envisaged, the identifier 122 can be communicated to the remote server 250 before the step of authentication of the remote server described hereinabove (the communication of this identifier is not necessarily secure). In this case, the public key 124 and the private key 251 can be selected by the server 250 as a function of the identifier received.

During a step 335, the remote server 250 searches a database 260 for a personalization data group corresponding to the identifier 122. In this personalization data group, which includes a sequence of personalization instructions, the remote server 250 goes to the record following the record corresponding to the last command 123 as received by the portable electronic entity 100. The remote server 250 reads the subsequent records, producing personalization instruction groups that it sends to the electronic entity 100 in which the personalization is to be effected, via the host station 200, and with the instructions signed by means of the private key 251, for example, to ensure their integrity. The records from the database 260 can include personalization instruction groups that include instructions having a variable length, for example.

For example, an instruction intended for the portable electronic entity includes an instruction number and an instruction type that indicates if an expected response is specified and if it is an instruction intended for the portable electronic entity to be personalized (for example to be updated) or the host station.

The instruction can also include instruction codes with, for example, in the case where the instruction is intended for the portable electronic entity to be personalized, an instruction length, an APDU command, an expected response length and, optionally, as a function of the type of instruction, an expected response content.

If the instruction is intended for the host station, the instruction codes indicate, for example, if it is an instruction to switch on the electronic entity, a switch off instruction, a clock modification instruction or an instruction for selection of an exchange protocol with the electronic entity. The data indicates, for example, a clock frequency or a voltage to be supplied to the portable electronic entity. In these latter cases, the report instructions are implicit.

Accordingly, in each step 335, the server 250 resumes personalization, in a personalization instruction group, at the instruction corresponding to the last instruction 123 received by the portable electronic entity 100.

Note that the remote server 250 and the electronic entity (or the host station 110 when the instructions are intended for it) communicate with each other in a secure manner, using the session key 116 set up during the step 325.

The next step is the step 330 to continue initialization until there are no further instructions to be sent to the portable electronic entity.

Note that, in the case where the instruction groups include instructions directly understandable by the electronic entity, the solution typically consists in encrypting the data sent to the entity by the instructions and not by the instruction groups as a whole. In the case of APDU instructions, at least a part of the data from the "data field" is typically encrypted. It is in fact necessary for the APDU instructions to be understood by the card.

Alternatively, personalization is effected with no history, for example when the electronic entity is a USB key and the host station is a personal computer, and when the application includes a user interface, in which case the user can launch a personalization process of his choice via this interface.

Throughout the description, there has been described the implementation of the present invention so that the portable electronic entity stores the instructions of an application enabling its own personalization. However, in variants that will be evident to the person skilled in the art, the "first" portable electronic entity includes means for connection to a host station and a memory storing instructions of an application that can be executed to carry out the personalization of a "second" portable electronic entity, possibly different from the first entity. Thus the second electronic entity can be personalized on any host station capable of executing the personalization application. Alternatively, the second entity is an integrated circuit in the host station.

In particular embodiments of the portable electronic entity that is the subject matter of the present invention, that entity includes a microcontroller adapted to operate in slave mode. The portable electronic entity therefore merely responds to commands, for example from a reader in the case of a microcircuit card.

In particular embodiments of the portable electronic entity that is the subject matter of the present invention, that entity includes a secure microcontroller. For example, it conforms to the "FIPS" security requirements, "common criteria" and/or the ISO 7816 standard. More generally, embodiments of the portable electronic entity include security means adapted to make secure at least part of the execution of the application loaded into and executed in the host station, in accordance with a predetermined security mode, in order to ensure that the data stream received and sent to that application can only be processed by the latter.

With regard to conjoint operation of the personalization server, the host station and the portable electronic entity, embodiments execute the steps described hereinafter.

First of all, the host station sends the server a personalization initialization request including information identifying the portable electronic entity to be personalized, in order to initialize the personalization checking processing means. This request can also include host station identification information enabling the server to send it the response, and where appropriate the host station type, the server possibly needing this information to determine the instructions that it can send to the host station.

The server then responds to the host station, either with an error message, or with an acknowledgement if no problem has been encountered.

The host station then identifies the portable electronic entity and communicates an identifier of that entity to the server together with a personalization instruction group request.

As a function of the identifier of the portable electronic entity and personalization data received from elsewhere, the server generates a personalization instruction group and sends it to the personalization station, preferably in encrypted or coded form.

During this step, the personalization server preferably defines the first personalization instruction group so that this group of instructions is completed only if, for the next instruction, the server needs the execution report for at least one preceding instruction.

The host station then receives the group of instructions, i.e. effects the decoding and/or the necessary analysis, and sends each APDU command from the group of instructions to the portable electronic entity.

The host station preferably executes at least one instruction to check at least one personalization instruction after sending the portable electronic entity another personalization instruction to which this checking instruction does not relate.

If, for an APDU command, no checking instruction integrated into the personalization instruction group received relates to this APDU instruction, the host station awaits a standard code from the portable electronic entity that indicates that the personalization instruction has been executed and verifies this standard code.

If not, the host station awaits a specific APDU response in a specific time interval, if that specific response and/or that specific time interval are specified in a checking instruction incorporated into the received personalization instruction group.

In the event of a problem, i.e. if the standard code or the expected response is not received during the specific time interval, personalization of the portable electronic entity is interrupted and a personalization interruption message is sent by the host station to the server.

In the absence of any problem, each response is placed in a buffer memory, in chronological order, with other personalization execution report information (for example date, time, portable electronic entity identifier).

If, during processing of the personalization instructions, a report instruction is encountered by the host station, the latter sends the server a report message, for example including the content of the buffer memory.

When all the personalization instructions have been processed, the host station sends the personalization server a report message including, for example, the content of the buffer memory.

On reception of each report message, the server analyzes the report and determines if it should instigate an action as a function of the result of that analysis. The server determines in particular if an error has been detected. If so, the error is processed. If not, the personalization server determines if personalization of the portable electronic entity has been completed. If so, a new portable electronic entity is loaded into the host station and personalization is repeated. If not, as a function of the identifier of the portable electronic entity, the report(s) received and personalization data received from elsewhere, the personalization server generates a new personalization instruction group and sends it to the host station, preferably in encrypted or coded form.

On the host station side, first of all, it receives a personalization instruction group from the server. The host station then extracts the next instruction from the last personalization instruction group received. During the first iteration of this step, the next instruction is the first instruction.

The host station then determines if the instruction extracted is associated with a checking instruction, i.e. if it identifies a response to be expected from the portable electronic entity in terms of content or maximum waiting time.

If so, the host station extracts from the personalization instruction group the identification of the response to be expected. If not, the host station stores, by way of expected response, a standard response, independent of the personalization instruction, and, by way of maximum waiting time, a standard waiting time.

Following one of these steps, the personalization station extracts the APDU command from the instruction extracted and sends it to the portable electronic entity. For example, this instruction is for writing of data by the portable electronic entity in the non-volatile EEPROM of the portable electronic entity.

The host station then awaits a response from the portable electronic entity. On reception of a response from the portable electronic entity, or at the end of the maximum waiting time, the host station writes the content of the command and the response, where applicable empty, into a report buffer memory, in chronological order.

The host station also determines if the response obtained is identical to the response expected. If not, the host station sends an error message to the server with the content of the report buffer memory. If so, the host station determines if the last group of instructions received still includes at least one instruction and, as a function of the result, repeats one or the other of the steps described hereinabove.

The invention claimed is:

1. A portable electronic entity that has a microcontroller device, comprising:
   a communication interface configured to establish communication with a host station; and
   a memory storing executable instruction code for an application executable by a CPU of said host station and adapted to be loaded into a host memory of said host station to be executed by the CPU of said host station, said application, upon execution by the CPU of the host station, causing the CPU of the host station to receive instructions from a remote server in communication with the host station and to send the instructions to the portable electronic entity to effect a personalization of said portable electronic entity.

2. The portable electronic entity according to claim 1, wherein the host station is a personal computer, and the memory stores instructions of the application configured to execute on the CPU of the personal computer.

3. The portable electronic entity according to claim 1, wherein the host station is a mobile telephone, and the memory stores instructions of an application configured to execute on the CPU of the mobile telephone.

4. The portable electronic entity according to claim 1, wherein said application is configured to set up a secure communication between at least the electronic entity and the remote server, the personalization being carried out over the secure communication.

5. The portable electronic entity according to claim 1, wherein the application is configured to cause the CPU to store, in the memory, the last personalization command received from the remote server that executed successfully, and to communicate said last command to said remote server.

6. The portable electronic entity according to claim 1, wherein the memory stores an identifier common to a plurality of portable electronic entities.

7. The portable electronic entity according to claim 1, wherein the memory stores a cryptographic key common to a group of portable electronic entities.

8. The portable electronic entity according to claim 1, further comprising:
a microcontroller adapted to operate in slave mode.

9. The portable electronic entity according to claim 1, further comprising:
a secure microcontroller.

10. The portable electronic entity according to claim 1, wherein the host station is configured to automatically load and execute the application upon detection of a connection of the portable electronic entity to the host station.

11. The portable electronic entity according to claim 1, wherein the application comprises an address of the remote server on a network.

12. The portable electronic entity according to claim 1, further comprises:
a means for selecting the instructions of said application as a function of the host station.

13. The portable electronic entity according to claim 1, wherein the memory is a read-only memory.

14. The portable electronic entity according to claim 1,
wherein the application is configured to cause the CPU to store, in the memory, an identifier which identifies the portable electronic entity, a last command received from the remote server, and a serial number associated with the last command, and
wherein the application is configured to cause the host station to send the identifier to the remote server, the last command received from the remote server, and the serial number associated with the last command.

15. A portable electronic entity that has a microcontroller device, comprising:
a communication interface configured to establish communication with a host station; and
a memory storing executable instruction code for an application executable by a CPU of said host station and adapted to be loaded into a host memory of said host station to be executed by the CPU of said host station, said application, upon execution by the CPU of the host station, causing the CPU of the host station to collaborate with a remote server in communication with the host station to effect a personalization of a second portable electronic entity,
wherein said application loaded into the host station configured the host station to receive instructions from said server and send the received instructions to the second portable electronic entity, and
wherein the instructions received from said server are received in the form of at least one group of instructions for personalization of the second portable electronic entity, the at least one group of personalization instructions including at least one personalization checking instruction enabling the host station to check correct execution of at least one personalization instruction.

16. The portable electronic entity according to claim 15, wherein the second portable electronic entity is an integrated circuit of the host station.

17. The portable electronic entity according to claim 15, wherein at least one of the instructions is an instruction directly understandable and executable by the portable electronic entity.

18. The portable electronic entity according to claim 17, wherein the at least one of the personalization instructions enables writing, by the second portable electronic entity, of data into a memory of the portable electronic entity.

19. The portable electronic entity according to claim 15, wherein at least one checking instruction is the expected result of the execution of a personalization instruction by the second portable electronic entity.

20. The portable electronic entity according to claim 15,
wherein the application is configured to cause the CPU to store an identifier which identifies the second portable electronic entity, a last command received from the remote server, and a serial number associated with the last command, and
wherein the application is configured to cause the host station to send the identifier to the remote server, the last command received from the remote server, and the serial number associated with the last command.

21. A method for personalization of a portable electronic entity that has a microcontroller device, comprising:
connecting a first portable electronic entity to a host station;
loading of an application from a memory of the first portable electronic entity to a memory of the host station, the application being comprised of executable program code suitable for execution on a CPU of the host station; and
executing said application by the CPU of said host station to effect a personalization of a second portable electronic entity in connection with said host station, said application causing the host station to communicate and retrieve information from a remote server for the personalization of the second portable electronic entity,
wherein the remote server sends at least a personalization instruction to the second electronic entity via the host station, and
wherein the personalization instruction is executed by the second electronic entity.

22. The method according to claim 21, further comprising:
communicating to the remote server an identifier of the second portable electronic entity, the last command received from the remote server, and a serial number associated with the last command.

23. The method according to claim 21, further comprising:
at the remote server, searching a database for a personalization data group corresponding to the identifier, and transmitting a record following a record that corresponds to the last command.

24. A method for personalization of a portable electronic entity that has a microcontroller device, comprising:
connecting a portable electronic entity to a host station;
loading an application from a memory of the portable electronic entity to a memory of the host station, the application being comprised of executable program code suitable for execution on a CPU of the host station; and
executing said application by the CPU of said host station to effect a personalization of the portable electronic entity in connection with said host station, said application causing the host station to communicate and retrieve information from a remote server for the personalization of the portable electronic entity,
wherein the remote server sends at least a personalization instruction to the portable electronic entity via the host station, and
wherein the personalization instruction is executed by the portable electronic entity.

25. The method according to claim 24, further comprising:
communicating to the remote server an identifier of the portable electronic entity, the last command received from the remote server, and a serial number associated with the last command.

26. The method according to claim 25, further comprising:
at the remote server, searching a database for a personalization data group corresponding to the identifier, and transmitting a record following a record that corresponds to the last command.

* * * * *